H. C. MARMON.
VEHICLE SPRING SUSPENSION.
APPLICATION FILED NOV. 8, 1915.
1,182,192.
Patented May 9, 1916.
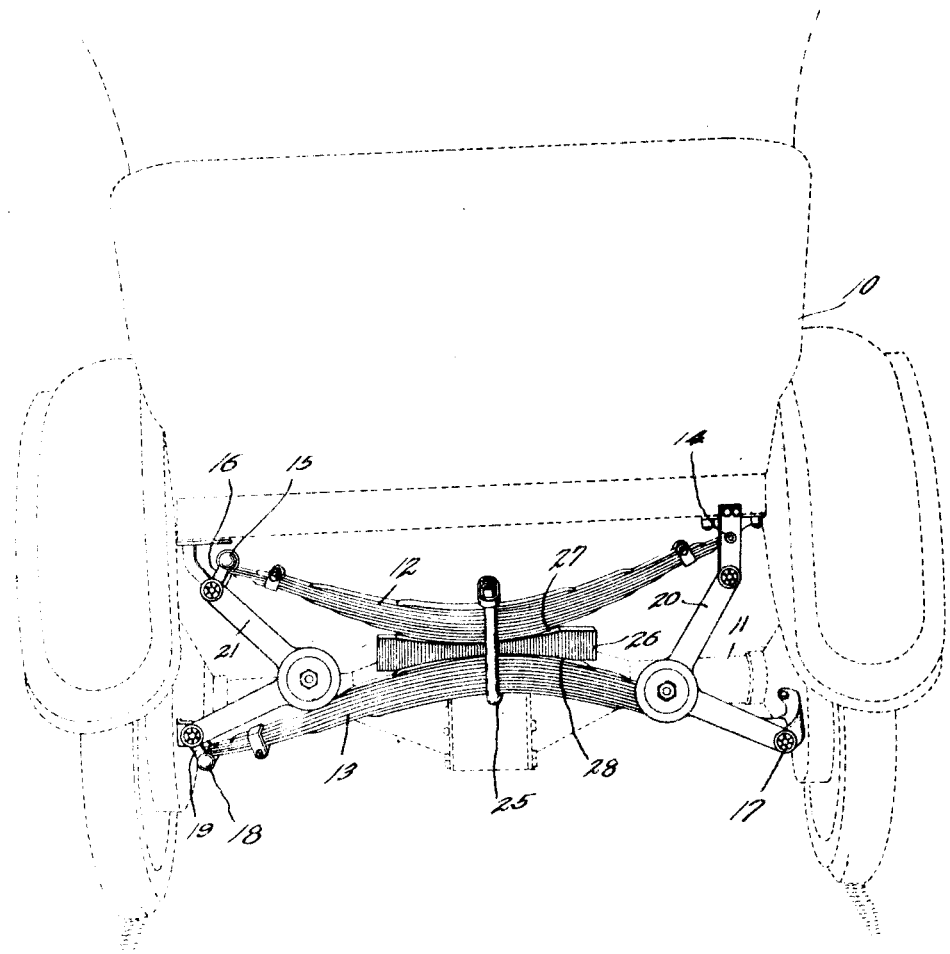
WITNESS
INVENTOR
Howard C. Marmon.
BY
Hood & Behley
ATTORNEYS

UNITED STATES PATENT OFFICE.

HOWARD C. MARMON, OF INDIANAPOLIS, INDIANA.

VEHICLE SPRING SUSPENSION.

1,182,192.  Specification of Letters Patent.  Patented May 9, 1916.

Application filed November 8, 1915. Serial No. 60,205.

*To all whom it may concern:*

Be it known that I, HOWARD C. MARMON, a citizen of the United States, residing at Indianapolis, in the county of Marion and State of Indiana, have invented a new and useful Vehicle Spring Suspension, of which the following is a specification.

It is the object of my invention to provide a vehicle spring suspension, especially for automobiles, which is very soft and easy-riding for normal vibrations, such as occur in reasonably smooth roads, but is considerably stiffened up upon severe deflections so as to prevent too great a relative movement between the vehicle body and the axles.

A very desirable automobile spring suspension is provided by two semi-elliptic springs laid crosswise of the car and placed convex side to convex side so that the upper spring is concave upward and the lower end concave downward. This produces a very easy riding under normal conditions. On rough roads, however, where there is a severe tendency to deflect the springs, this type of suspension has not heretofore been satisfactory because it permits too great a movement between the vehicle body and the axles and often permits the body and axles to strike each other. However, by putting between the two springs a block which is progressively engaged by the springs along their length as they are deflected, I have found that the springs are made materially stiffer as they are deflected, and therefore an easy riding spring is provided for normal conditions and a stiff spring when severe deflections are produced and stiffness is needed.

The single figure of the drawing illustrates my vehicle spring suspension, as applied to the rear of an automobile.

The vehicle body 10 is supported on the rear axle 11 by my improved vehicle mounting. Two semi-elliptic springs 12 and 13 extend transversely of the vehicle at its rear and are put together convex side against convex side, the upper spring 12 being concave upward and being attached at the points 14 and 15 to suitable supports on the body 10, a link 16 being provided for the attaching point 15 so as to allow the lengthening and shortening of the spring 12, and the lower spring 12 being concaved downward and being attached at the points 17 and 18 to suitable supports on the chassis of which the axle 11 forms part, a link 19 being provided for the attaching point 18 so as to allow lengthening and shortening of the spring 13. The points 14 and 17 may be connected by a shock absorber 20, and the points from which the links 16 and 19 are hung may be connected by a similar shock absorber 21.

The middles of the two springs 12 and 13 are clamped together by a U-bolt 25, or similar clamping device, and between the two springs is placed a block 26 which is held by the same clamp 25. The upper and lower surfaces 27 and 28 of the block 26 are so shaped that normally they engage the springs 12 and 13 only for a short distance at the middles thereof, and are spaced therefrom throughout the rest of their length; and this spacing is such that during travel over normally smooth roads the surfaces 27 and 28 remain mostly out of engagement with the springs 12 and 13. However, this spacing is such that upon severe deflections of the springs 12 and 13, the distance for which such springs rest against the surfaces 27 and 28 is greatly increased, preferably in a plurality of successive steps, so that upon a given severe deflection the lowest and shortest leaf of the spring 12 throughout its whole length engages the surface 27 and the uppermost and shortest leaf of the spring 13 throughout its whole length engages the surface 28, and upon a still further deflection the next longer leaf of each spring engages the surfaces 27 and 28, thus reducing by successive steps the yieldable lengths of the springs and thereby increasing their stiffness. This increase in stiffness only becomes effective upon severe deflections, so that under ordinary conditions the spring suspension is soft and easy riding, but under abnormal conditions, such as are met with on rough roads, the spring suspension is materially stiffened and prevents the vehicle body from striking the axles.

I claim as my invention:

1. A vehicle spring suspension, comprising two semi-elliptic springs placed together convex side against convex side for attachment respectively to a vehicle body and a vehicle chassis, and a block placed between such springs and normally engaging them for a short distance only but engaging them for an increased distance to produce stiffening of the springs upon severe deflections thereof.

2. A vehicle spring suspension, comprising two semi-elliptic springs placed convex side toward convex side, a block placed between said springs, and a clamp for clamping the two springs and block together at their middles, said block normally engaging the springs only near the middles thereof but being shaped so that upon severe deflections the length of such engagement is increased lengthwise of the springs.

3. A vehicle spring suspension, comprising two multi-leaf semi-elliptic springs placed convex side toward convex side, a block placed between said springs, and a clamp for clamping the two springs and block together at their middles, said block normally engaging the springs only near the middles thereof but being shaped so that upon a given severe deflection the short leaf on the convex side of each spring comes into engagement with the block throughout its whole length and upon a further deflection the next longer leaf of each spring comes into engagement with such block, thus producing progressive stiffening of the springs.

4. A vehicle spring suspension, comprising two multi-leaf semi-elliptic springs placed convex side toward convex side, a block placed between said springs, and a clamp for clamping the two springs and block together at their middles, said block normally engaging the springs only near the middles thereof but being shaped so that upon a given severe deflection the short leaf on the convex side of each spring comes into engagement with the block throughout its whole length, thus producing stiffening of the springs.

In witness whereof, I have hereunto set my hand at Indianapolis, Indiana, this 6th day of November, A. D. one thousand nine hundred and fifteen.

HOWARD C. MARMON.